Sept. 13, 1927. 1,641,960
C. P. BROCKWAY
AIR COOLED ENGINE
Filed Feb. 21, 1921 3 Sheets-Sheet 1
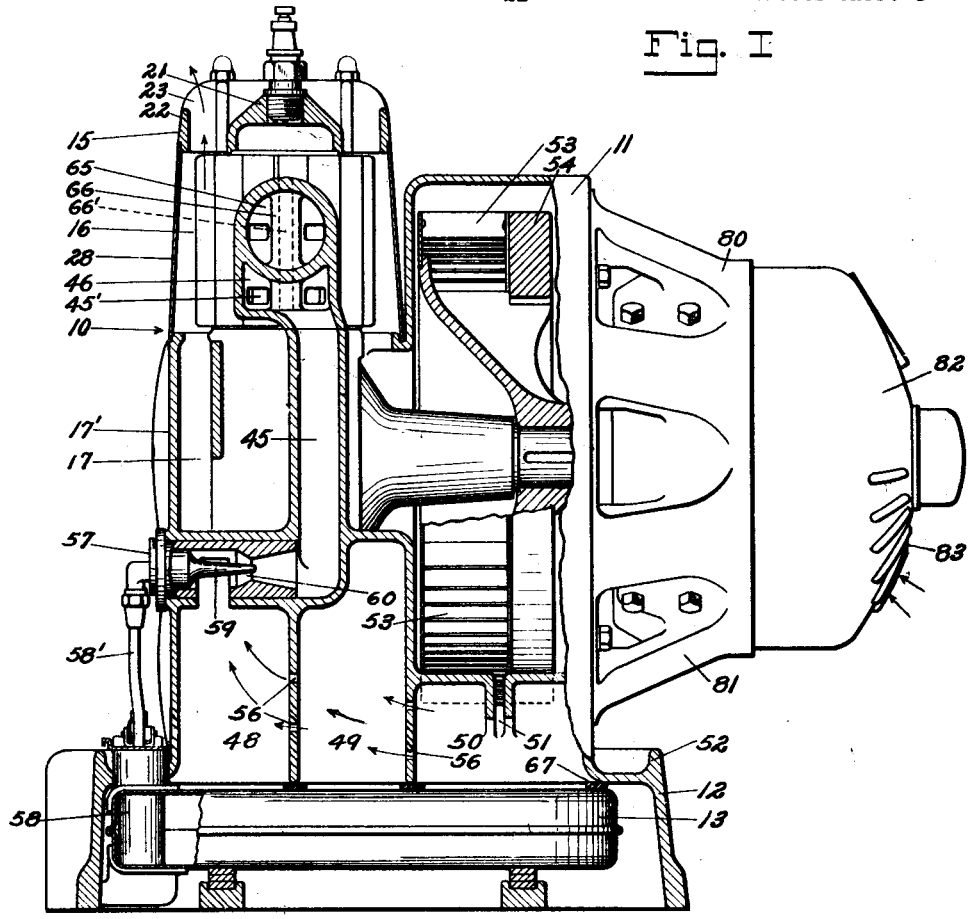
Fig. I
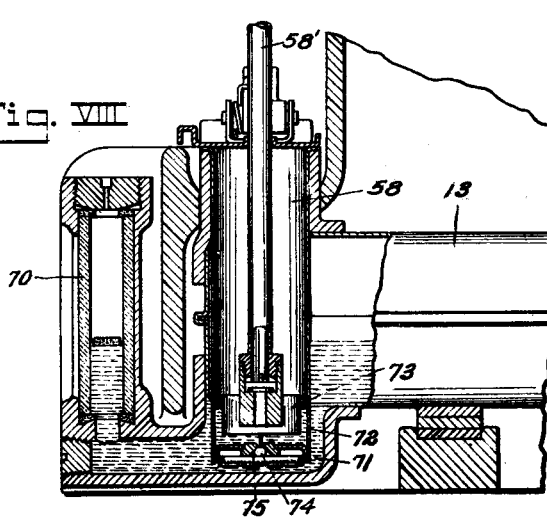
Fig. VIII
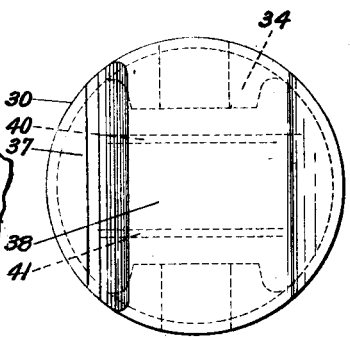
Fig. VI
INVENTOR.
Carl P. Brockway
BY Chester H. Bazelton
ATTORNEYS.

Sept. 13, 1927.
C. P. BROCKWAY
AIR COOLED ENGINE
Filed Feb. 21, 1921
1,641,960
3 Sheets-Sheet 2
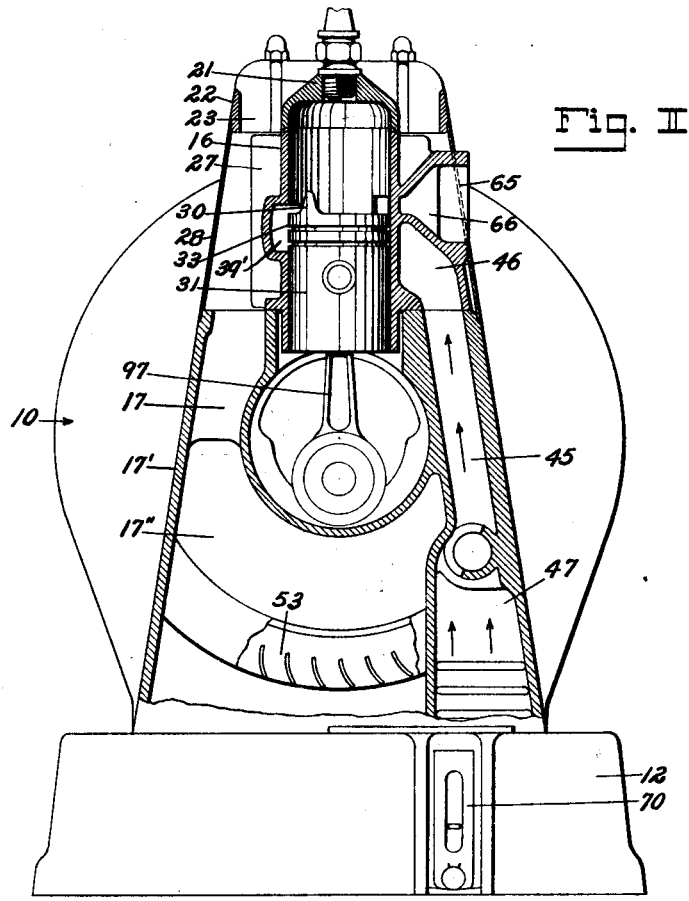
Fig. II
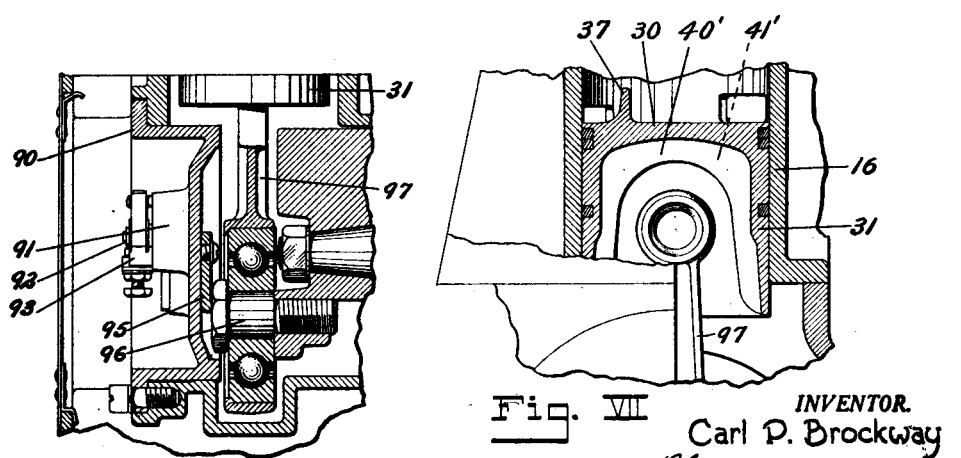
Fig. IX
Fig. VII
INVENTOR.
Carl P. Brockway
BY Chester W. Braselton
ATTORNEY Sept. 13, 1927.
C. P. BROCKWAY
1,641,960
AIR COOLED ENGINE
Filed Feb. 21, 1921
3 Sheets-Sheet 3
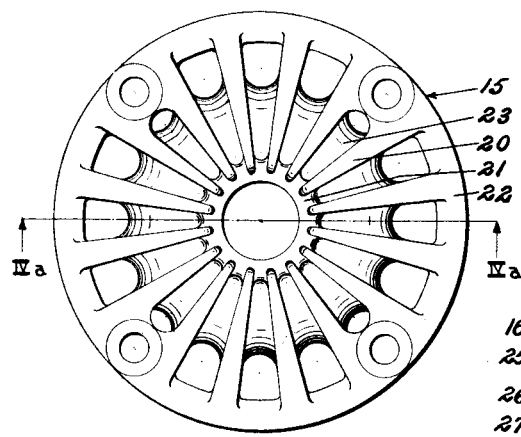
Fig. III a
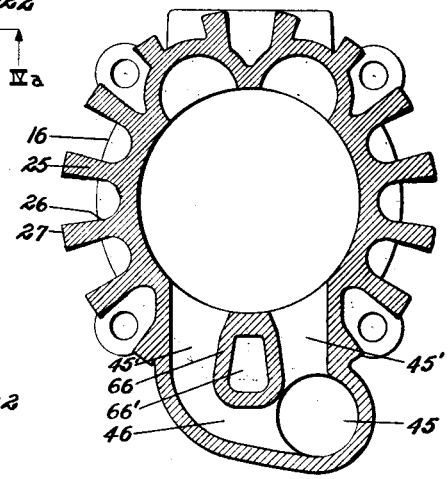
Fig. IV b
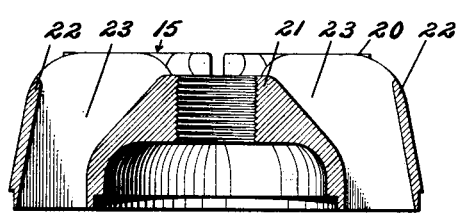
Fig. IV a
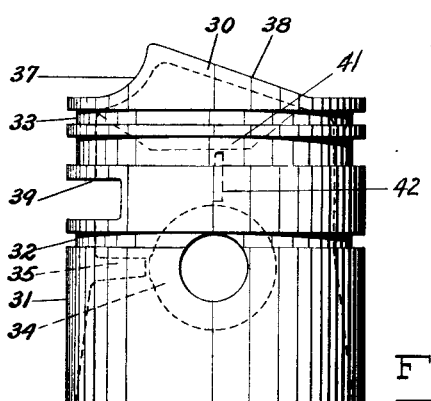
Fig. V
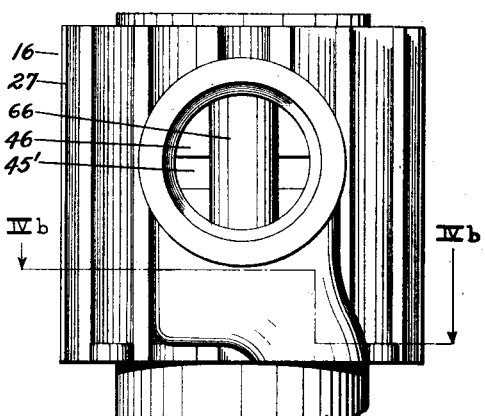
Fig. III b
INVENTOR.
Carl P. Brockway
BY Chester H. Buelton
ATTORNEYS.

Patented Sept. 13, 1927.

1,641,960

UNITED STATES PATENT OFFICE.

CARL P. BROCKWAY, OF TOLEDO, OHIO.

AIR-COOLED ENGINE.

Application filed February 21, 1921. Serial No. 446,697.

This invention relates to a novel and radical application of the principles of heat dissipation whereby unusual meritorious results in the cooling by air of a gas engine are obtained to such a degree that successful air cooling of a two cycle internal combustion engine is made possible. The invention further relates to the adaptation of such an engine with a generator forming a power plant, the assembly of the several units being such as to produce a compact unit as a whole, each unit thereof being also designed to facilitate production, eliminate parts, reduce cost and otherwise result in a device of the character indicated which has proven greatly superior to any other arrangement heretofore known.

Several important and radical features enter into the construction of my air cooled engine which render possible the air cooling of a two cycle engine of the character referred to and of primary importance is the principle of so constructing the various parts of the engine, which may be made separately to facilitate production, that the metal is so arranged as to provide as nearly as possible an equal dissipation of heat from the hot portions of the engine, thus preventing warping and other disadvantages heretofore present which materially interfered with successful air cooling of certain types of gas engines. Thus my invention includes such a correlation of cylinder head, cylinder, crank case, intake, and exhaust as to produce a unitary structure capable of successful operation. An important structural feature present in the engine head and cylinder and other hotter parts of the engine, is a construction of heat dissipating fins so arranged as to provide for an equal heat dissipation throughout the entire exposed areas thereof, which very materially aids in obtaining a uniform temperature throughout the entire engine, the bodies of the cylinder head and cylinder being thereby uniformly cooled and cooled to a very much greater degree than has been heretofore possible.

A further object of the invention is to provide a structure of the character indicated in which a minimum amount of air for cooling will produce a maximum cooling effect, thus having an important advantage in permitting the construction of a small compact engine and moreover, obtaining a greater cooling effect with a given size of heat dissipating fins.

The invention further includes a particular design in a two cycle gas engine, of a bridge across the exhaust port which is employed for the purpose of cooling the exhaust port and retaining the piston rings in position, the location of the exhaust relative to the intake being such as to balance the heat dissipating units.

In carrying the invention into practice I have applied the principle indicated above to the design of the piston itself which has particular utility in a two cycle gas engine, in that the piston is cooled by the mixture passed from the crank case to the cylinder and the mixture is so directed relative to the supporting rib as to produce particularly efficient results, coming first in contact with the body of the piston proper which directs the exhaust and therefore the hottest gases through the exhaust port.

The invention further resides in the employment of certain heat dissipating means whereby an important result is obtained in preventing the passage of the heat from the piston head to the piston skirt and rings which causes overleakage of the oil in the ring grooves, carboning up the piston and greatly interfering with the successful operation of the engine. By preventing the heat from passing from the head to the skirt I entirely eliminate these heretofore unsurmountable difficulties and may accomplish this by either dissipating the heat by providing a certain type of heat dissipating fins or by so designing the piston as to prevent passage or conductivity of heat through the metal of the piston itself from the head to the skirt and consequently piston rings.

The invention also has for its object to so design a piston as to obtain the cooling effect suggested and incidentally strengthen the same, the construction having an important added advantage in heating the mixture employed for cooling or further vaporization and in this way increase the efficiency of the engine in action.

Further objects of the present invention include the construction of the crank case so made as to also permit the induction pipe for conducting the mixture to the cylinder, to be passed by the piston into the crank case proper for compression, as will be understood; to provide a muffler for the air intake of a novel construction adapted to materially eliminate noise of intake for a two cycle engine, the arrangement also operating to facilitate passage of the cooling air and therefore perform a double function.

As hereinbefore suggested there are several important structural advantages incorporated in my present invention, it being the object thereof to produce an air cooled engine of the type indicated and a power plant which will be of such simplified construction as to very materially reduce the cost thereof. To this end, the fuel tank—and I may employ either kerosene or gasoline—is made and so formulated as to form a closing chamber for the air intake muffler hereinbefore mentioned. In this way the casting of the crank case with the intake muffler attached is greatly facilitated and coring is avoided as will be understood by those skilled in the art.

Further objects of the invention include such design of fuel tank as will permit obtaining a constant level of fuel and an automatic supply of the mixture at starting and during operation.

In furthering the objects of the invention I have also so designed the ignition timer and the assembly thereof with the engine as to be driven directly from the piston crank and so located the timer in the engine head as to reduce the size, facilitate assembly, and eliminate driving parts heretofore required.

Other objects and advantages of the present invention will be apparent from the description.

One embodiment of my invention is shown in the accompaying drawings in which,

Figure I is a vertical elevation partly in section showing my improved type of engine assembly in an improved power plant construction.

Figure II is a vertical sectional view showing the engine and intake.

Figures III (a) and III (b) represent a plan view and side elevation of my improved cylinder head and cylinder, respectively.

Figures IV (a) and IV (b) are sectional views of each.

Figure V is a side elevation showing my novel construction of piston, while

Figure VI is a top plan view thereof.

Figure VII is a modified embodiment of my improved piston construction.

Figure VIII is a sectional view showing the fuel tank and constant lever maintaining structure.

Figure IX is a detail view showing the timer assembly.

It is believed that my present invention shows a radical change in the art of air cooling gas engine design susceptible to a wide variation of the employment of the principles thereof and I have shown the same in one embodiment only and this for the purpose of illustration. Thus referring to Figure I the engine as a whole is indicated at 10, shown as directly coupled with the generator 11, both mounted on a base 12 in which is located the fuel tank 13 as heretofore suggested. The engine proper is made in sections including the head 15, the cylinder section 16, the crank case section 17 which is preferably integral with a base 12, the base and crank case being of general pyramidal shape to facilitate casting or withdrawal of the patterns from the mold as will be apparent to those skilled in the art.

One embodiment of my invention whereby the engine cooling and efficient operation of the engine are obtained is illustrated as applied to the engine head 15 and cylinder 16 shown in section in Figures III (b) and IV (b). The distribution of the metal and the construction and design of the heat dissipating means as illustrated in Figures III (a) and IV (a) where it will be seen that, as of primary importance, the head is symmetrical and that the heat dissipating ribs or fins 20 which radiate from the hub or center 21 which forms the opening for the spark plug of the engine, are made to gradually increase in size radially from the center of the head. Each of the extended ribs 20 is connected peripherally by a band or ring 22 and air is adapted to pass through the head, through the openings 23 formed between the adjacent heat dissipating fins or ribs 20 and the hub 21 and ring 22. By this construction it will be seen that the passage of air is entirely enclosed on four sides, thus facilitating a minimum amount of air for a maximum cooling effect. The air is permitted to contact particularly with the central hub 23 and an advantageous cooling is thereby produced. At the same time, the several heat dissipating fins 21 which gradually increase in thickness radially from the center of the hub, operate to rapidly conduct the heat away from the extreme hot central hub portion 23 in such a manner as to permit the air adjacent the outer portions of the heat dissipating fins to carry off the same. In this action, the connecting ring 22 materially aids as it forms a large body of metal to aid the heat being rapidly conducted without being first cooled by the air with a result that the construction provides for at least equal heat dissipation throughout the entire body of the metal constituting the head of my improved air cooled engine. I prefer to construct the head 15 of aluminum or of a material whose heat conductivity is such as to facilitate the production of the efficient results indicated. It will be seen that the further the distance from the center, the larger the fin's area radiation which will operate to properly cool this part of the fin and the fin having the larger body has a greater heat capacity so that the central hub 23 is rapidly cooled both by the conductivity along the fins and by the radiation permitted because of the relatively large air surface adjacent the hub caused by a reduction in size of the fin at this point.

The cylinder 16 is shown in section in Figure IV (b) as provided with longitudinally extending heat dissipating ribs 25 which are likewise made to gradually increase from the point 26 of the connection with the cylinder wall 16 to the extremity 27 thereof. It will be understood that the air passes up longitudinally of the cylinder between these fins and through the air passage 23 in the cylinder head. The cylinder to facilitate this action, is enclosed by a thin sheet metal casing 28 as shown in Figures I and II. It is to be understood that the ring 22 employed in the head construction may likewise be used in the cylinder construction, if desired, but in the embodiment here, the cylinder is made of cast iron whose heat conductivity is lower than that of aluminum and hence I have found because of this lower conductivity that the ring construction does not add sufficient cooling effect over the fin construction alone to warrant the use of the added amount of metal.

The piston proper will now be described. Referring to Figure V it will be shown that the same has a head 30 which may have cast integral therewith, a depending flange or skirt 31 in which may be formed the groove 32 for a piston ring. The piston head may also have a piston ring groove 33. It will be noted that 34 is the crank arm bearing and it will be seen that there is provided a bridge 35 extending from said bearing to the cylindrical wall 31 of the skirt of the piston. The piston head 30 is provided with the dividing rib 37 as commonly used in two cycle engines and it will be noted that this rib is located adjacent the same side as the bridge 35 and that it has a long gradual slope 38 toward the exhaust side of the cylinder. It will be noted that the piston port 39 is located above the bridge 35 and relatively close underneath the piston head 30. By this action and arrangement of parts the intake mixture is made to pass up against the piston head 30 before passing through the outlet port 39 to be transferred from the crank case into the cylinder proper, the bridge 35 diverting the same upwardly into contact with the lower side of the sloping portion 38 of the deflecting rib 37.

In order to further facilitate the cooling and to strengthen the piston I have provided a plurality of ribs 40 and 41 in the head 30 extending transversely relative to the crank arm bearing directed toward the piston port 39 and projecting downwardly below the same. These ribs guide the passage of the cooling mixture and strengthen the construction of the piston. A transverse plate 42 is also provided which serves to force the cooling gases against the ribs 40 and 41 and piston surface 38. It will be noted that in order to further cool the piston the formation of the piston ring groove 33 operates as a choke or throttle to reduce the body of the piston and hence its conductivity from the piston head to the skirt 31. The sweeping action of the passage of the relatively cool explosive mixture coming in contact with the ribs 40 and 41, or as many as may be desired, directly against the exhaust portion of the guiding rib 37 before passing through the port 39 produces extremely efficient cooling as will be understood by those skilled in the art.

In the modification shown in Figure VII the ribs 40' and 41' are shown as extending downwardly to the extreme bottom of the skirt 31. In this case, the piston is made of aluminum, the conductivity of which is such as to obtain a decided advantage by the employment of the character of heat dissipating ribs shown. Of course any other metal of sufficient conductivity could be used and the length of the extent of the ribs 40' and 41' would be a function of the heat conductivity of the material of the piston.

Referring to Figures I and II it will be seen that the crank case 17 cast in the sloping shape indicated is provided with an integral induction pipe 45 adapted to convey the explosive mixture to the intake port 46 which is opened by the clearance of the piston skirt 31 above the same. The induction pipe is provided with an intake muffler 47 shown in Figures I and II. To provide this structure I prefer to construct the same with the plurality of chambers 48, 49, and 50 and gradually transfer the air from the intake chamber 50 to the supply chamber 48 thereby materially reducing the noise of suction in a two cycle engine. An important feature of the invention includes an elongated slot 51 in the intake chamber 50. It will be noted that the chamber 50 is formed in the expanded portion 52 of the crank case at its point of juncture with the base 12. The intake slot 51 is located in this portion of the intake directly beneath the fan 53 which is made integral with the fly-wheel 54 of the engine proper. A plurality of slots or openings 56 are located in the several partitions forming the separate chambers to permit a passage of air to the mixing valve.

As clearly shown in Figure I, I have provided a small type of Venturi mixing valve 57 supplied with fuel from a supply tank 58 and provided with a means for adjusting the air intake from the supply chamber 48. The fuel passes from the pipe 58' through the nozzle 59 in the mixing valve, the outlet port 60 of the nozzle for the mixing valve terminating in a Venturi shaped mixing chamber directly adjacent the induction pipe 45, as clearly shown in Figures I and II.

As heretofore indicated the engine is designed to provide for a balance in the heat dissipation and one means for accomplishing this includes the correlative location of the intake and exhaust. This will be apparent from Figures I and II where the exhaust outlet 65 is shown as cast directly above the intake 46 so that the incoming mixture may operate to cool the extremely hot portions of the exhaust outlet 65.

Further, as heretofore suggested in the statement of the invention, the exhaust outlet 65 is provided with additional cooling means arranged in the bridge structure of the exhaust port for the cylinder 16. As shown in Figures I, II, and IV(b) the bridge 66 for the exhaust outlet 65 is hollow to provide a central air passage 66' open at both ends so that air in its forced or natural circulation passing upwardly around the cylinder 16 may pass directly through the opening 66' to further effectually cool the exhaust outlet 65 and particularly the bridge 66. The bridge 66, as will be understood by those skilled in the art, is necessary to permit the use of a relatively large exhaust outlet and at the same time prevent the piston rings from expanding out of the grooves to such an extent as to contact with the edge of the cylinder at the top and bottom of the outlet port. Referring to Figure IV(b), it will be seen that the cross sectional shape of the central bridge and air passage 66' corresponds in contour to the sectional shape of the exhaust outlet 65. Thus in this way, the principles suggested of a balance in heat dissipation means and equalization of the cooling effect is further carried out since the two exhaust passages, formed by dividing the outlet 65 of the bridge 66, are substantially equal and as will appear from Figure I, each section is practically entirely surrounded by the cooling air.

As heretofore indicated, the fuel tank 13 constitutes means for closing and sealing the bottom of the intake muffler 48 as illustrated in Figure I, so that the crank case and base 12 may be cast without coring which would be otherwise necessary, if the base for the muffler were made integral with the partitions 49, for example. A suitable cushion or gasket means 67 may be interposed between the top of the fuel tank 13 and the bottom edge of the crank case where the same joins into the base 12. Means are employed to clamp the tank 13 up against the base of the crank case compressing the base of the cushioning means 67 to securely hold the parts in assembled relation.

As shown in Figure VIII the tank 13 may be provided with a visible gage 70 and formed integrally therewith is a well 71 to provide for receiving the cylinder 72 which forms an auxiliary supply tank 58 operating as a means to maintain a proper level for the fuel drawn into the Venturi mixing valve through the pipe 58'. As shown, the pipe 58' extends down into the cylinder 72 adjacent the bottom thereof and guides the float 73 which carries a valve 74 controlling the passage of fuel through the port 75 from the tank 13 to the well or reservoir 58. It will be noted that the base 12 is cast with the well integral therewith.

An important feature of the present invention, as has heretofore been indicated, is a compact power plant or assembly of gas engine and generator with an efficient cooling means for the plant as a whole, as well as the cooling of the engine per se. Thus I have shown the generator 11 mounted directly on the crank shaft of the engine and it is to be noted that the generator casing 80 is provided with a plurality of peripherally arranged large openings 81 to permit air to pass directly over the fields of the generator while the cover 82 for the generator is also provided with openings 83 which permits air to be drawn longitudinally through the armature and between the same and the fields. It will be understood that the flywheel fan 53 draws the air inwardly, discharging the same into the space between the outer wall 17' of the crank case housing and the inner wall or crank case 17 proper. Hence the same passes upwardly between the casing 28 and the cylinder 16 in the spaces between the heat dissipating fins 25 and through the cylinder head by way of the passages 23 in a manner heretofore described. It will be noted that the intake muffler and induction pipe perform the added function of diverting the cooling air as it is received in the lower part of the double walled housing and crank case 17 and directs the same upwardly as stated. The direction of the circulation of air in the manner indicated is advantageous in that circulation is facilitated because of the fact that the inert air heated adjacent the cylinder cover tends to move upwardly in the same direction as that provided by the forced circulation of my invention.

The ignition timer and assembly is illustrated in Figure IX where it will be seen that the end head 90 of the crank case has a central bearing 91 carrying the cam shaft 92. On the outer end of it is mounted the cam 93 adapted to operate a make and break mechanism in a manner well understood by those skilled in the art. The cam shaft 92 extends through the head 90 and is secured to receive an operating arm 95 which is bent downwardly as shown, to connect to the crank bearing 96 of the piston operating rod 97. It will thus be seen that the driving means for the timer are located internally, while the timer itself is conveniently located.

It will be understood that my invention as disclosed herein is susceptible to wide variations in detail of structure as well as the applications of the principles set forth.

The operation of the improved two cycle air cooled engine per se as well as the operation of the plant as a unit will be understood from the foregoing, it being apparent that the engine could be used for any desired purpose and the novel cooling means could be used with various types of engines of any cycle. Referring to Figure II it will be seen that cooling air is made to circulate through the double walled crank case and base housing 17, in the embodiment shown, being forced therein by the fan 53. The air entering the chamber 17″ passes upward in the direction of the arrows as indicated, along and between the cylinder, heat dissipating fins 27, and between the cylinder and the enclosed casing 28 passing directly through the several passages 23 in the engine head 15. At the same time air passes through the bridge cooling conduit 66′ as heretofore described. The natural tendency of the heated air surrounding the engine being to rise, it will be seen that the circulation upward has advantages in moving with the natural circulation of the air rather than against the same. The heat dissipating action of the cylinder and head provided with the heat dissipating ribs has been heretofore described and it will be seen that the structure of the parts and the assembly of the same all cooperate advantageously to rapidly conduct the heat away from the extremely heated surfaces by increasing the area of conducting metal and thus increasing the cooling produced by a given amount of air at a given temperature. The above result is obtained without any distortion of the parts due to the uneven distribution of heat.

It will be understood that in the operation of the two cycle engine constituting my invention, the induction pipe 45 receives air from the intake muffler 47 passing through the mixing chamber 60 and is delivered through the ports 45′ into the interior of the crank case 17 when the lower edge of the piston skirt 31 clears the port 45′ on the upward stroke of the piston. As the piston descends the charge received is compressed in the crank case and in being transferred to the cylinder 16 above the piston is made to cool the piston in the manner heretofore described by being diverted by the bridge 35 to sweep along the inclined end surface 38 of the division rib passing through the piston port 39 into the cylinder wall by pass 39′ to the cylinder proper. Thus the cooling mixture contacts first with the hottest portion of the piston to obtain a maximum cooling effect, the fins or ribs 40—41 materially aiding in this cooling. In the modification shown in Figure V the extreme heat of the piston head is choked by the reduced amount of metal 33 from being conducted down into the skirt 31 while in the modification shown in Figure VII where a different type of material is used, the extended ribs 40′ and 41′ dissipate the heat from the head into the cooling mixture and provide means for rapidly conducting the heat away from the head.

The assembly of the engine per se is facilitated by this structure. As heretofore stated the upper surface of the pyramidal shaped crank case and base housing may be machined in one portion to provide for a fit of the cylinder 16 on the upper edge of the crank case 17, and for the junction of the two parts of the induction pipe 45 when cast integral with the crank case and base housing 17 as heretofore stated and the other formed integral with the cylinder 16. The assembly of the air mixing valve 58 which may be connected and disconnected as a unit in the transverse portion of the induction pipe 45, is also advantageous in production and assembly. The utilization of the fuel tank 13 housed in the base 12 to form a seal for the bottom of the intake muffler 47 is also of great importance from a production point of view and because of the elimination of parts heretofore required.

As a combined gas engine and generator power plant it will be seen that the embodiment of my invention as illustrated herein has material advantages in operation and construction, in that the fan wall housing may be made integrally with the crank case and base housing 17 and 12 to also provide a face wall against which the casing 18 for the generator 11 may be conveniently bolted. By the structure herein the openings 81 in this support and case 80 permit air to be drawn in by the fan 53 directly adjacent the generator fields, while the opening 83 in the end cover 82 permit air to enter and pass through and around the armature and other portions of the generator. The assembly of the ignition timer 91 and the support thereof on the end head 90 for the crank case, is also important in reducing the number of parts and permitting the timer mechanism and breaker to be located externally on a casting 90, with the timer driving means 95 located internally thereof and driven directly from the main operating engine part. In this way the driving means are materially reduced in number of parts, expense of manufacture, and time of assembly. Moreover, any adjustment of the timer in operation is facilitated because the parts thereof are readily accessible and exposed.

I am aware that the particular embodiment of my invention above described and illustrated in the accompanying drawings is susceptible of considerable variation without departing from the scope thereof, and therefore I desire to claim my invention broadly as well as specifically as indicated by the appended claims.

What I claim is:

1. An air cooled engine including in combination, a cylinder and a cylinder head each of said members being provided with integral radially extending continuous heat dissipating fins symmetrically disposed relative to said members and each fin being so constructed as to have a greater width at points removed from the cylinder than at points adjacent the cylinder, the fins gradually increasing in cross sectional area radially from said members to provide means to conduct heat away from said members.

2. Cooling means for an internal combustion engine including a plurality of symmetrically disposed integral radial heat dissipating fins gradually increasing in cross-sectional area from the engine outwardly therefrom and a heat conducting and radiating encircling member intimately connecting the outermost portions of said fin for the purpose described.

3. Cooling means for an internal combustion engine including, in combination, a plurality of radially disposed heat dissipating fins extending continuous from top to bottom of an element of said engine and integral therewith the heat transfer resistance of said fins gradually decreasing toward the outer extremities thereof and a connector at the extremities of said heat dissipating fins extending longitudinally relative to said member to provide a plurality of enclosed passages for the heat cooling medium and to provide means for conducting heat away from the hottest portions of said members in such proportion to the radiating capacity of said heat dissipating means as to provide an equalization in the heat dissipation of the unit and a uniform temperature thereof.

4. A cylinder for a gas engine including in combination, a cylinder wall, a plurality of radially disposed continuous symmetrically arranged heat dissipating fins gradually increasing in cross sectional area from said heat dissipating member radially thereof, an exhaust outlet located on one side of said cylinder and an inlet for an explosive mixture located immediately adjacent thereto, said fins being arranged approximately vertically so as to provide a free circulation of the cooling medium against the cylinder wall valves and the increasing area of the heat dissipating fin being so proportioned to the area of the cylinder wall as to provide means for substantially equal cooling of said cylinder, said exhaust and intake operating to balance the heat dissipation and distortion throughout said cylinder.

5. In an air cooled engine, the combination of a cylinder, and continuous heat radiating fins affixed to the cylinder, said fins being thinner adjacent the cylinder than at the outer edges thereof.

6. In an air cooled combustion engine, the combination of cylinder adapted to be heated and approximately vertical; heat radiating and dissipating fins fixed in continuous units to said cylinder, said fins having a lesser thickness adjacent the cylinder than at the outer limits thereof whereby the area of radiating surface relative to the minimum conducting area between the fins and cylinder is increased.

In testimony whereof I affix my signature.

CARL P. BROCKWAY.

CERTIFICATE OF CORRECTION.

Patent No. 1,641,960.  Granted September 13, 1927, to

CARL P. BROCKWAY.

It is hereby certified that error appears in the printed specification of the above numbered patent requiring correction as follows: Page 6, line 56, claim 4, before the word "valves" insert the word "and"; and that the said Letters Patent should be read with this correction therein that the same may conform to the record of the case in the Patent Office.

Signed and sealed this 6th day of March, A. D. 1928.

Seal.

M. J. Moore,
Acting Commissioner of Patents.